Dec. 27, 1955 C. J. LUCIA 2,728,241
FORWARDLY AND REVERSELY DRIVING TRANSMISSIONS
AND CONTROLS THEREFOR
Filed April 7, 1953 5 Sheets-Sheet 1

INVENTOR.
Carroll J. Lucia.
BY Wilson and
Pedrow
ATTORNEYS.

INVENTOR.
Carroll J. Lucia
BY
Wilson and Redrow
ATTORNEYS.

Dec. 27, 1955

C. J. LUCIA

2,728,241

FORWARDLY AND REVERSELY DRIVING TRANSMISSIONS
AND CONTROLS THEREFOR

Filed April 7, 1953

INVENTOR.
Carroll J. Lucia
BY
Wilson and Redrow
ATTORNEYS.

United States Patent Office 2,728,241
Patented Dec. 27, 1955

2,728,241

FORWARDLY AND REVERSELY DRIVING TRANSMISSIONS AND CONTROLS THEREFOR

Carroll J. Lucia, Birmingham, Mich., assignor to Studebaker-Packard Corporation, a corporation of Michigan Application April 7, 1953, Serial No. 347,303

26 Claims. (Cl. 74—336)

The present application relates to forwardly and reversely driving transmissions and controls therefor, particularly to a dual utility transmission design of a type useful on shipboard and in other marine installations in which duplicate power plants are arranged side by side and each requires a transmission similar to or more desirably identical with the transmission of the other power plant but providing rotation in an opposing sense.

It is an object of the invention to provide a pressure fluid controlled marine transmission having a pair of forward and reverse drive establishing friction members and a control valve which is manually operated to direct pressure fluid for selectively engaging the drive members to establish forward or reverse drive trains and to control the pressure fluid in a neutral position to effect a neutral setting of the drive trains.

Another object is to provide, in a propeller connected forwardly and reversely driving transmission subject to sustained forward propeller thrust and having pressure fluid actuated drive controls, a pressure actuable fluid thrust bearing means which is under the control of the transmission drive controls and which is simultaneously caused to be pressurized thereby whenever forward drive is initiated such as will give rise to forward propeller thrust on the thrust bearing means. The thrust bearing means as presently contemplated includes a tapered roller bearing for forward thrust and a tapered roller bearing for rearward thrust and together forming a first mechanical bearing span, and also a separate hydraulic bearing which is pressurized in one direction only and which, in varying degrees depending upon the amount of forward thrust in the propeller, either loads up the tapered bearing for the rearward thrusts or assists the tapered bearing for the forward thrusts but in a manner whereby neither tapered roller bearing is under any conditions loaded above a predetermined amount of thrust. It is a further object therefore of the present invention to provide a compound thrust bearing means consisting of mechanical and hydraulic components wherein in at least one forward speed condition the hydraulic component balances all propeller thrust to leave the mechanical component completely unloaded and unsubjected to strain and moreover, the hydraulic component serves to predetermine the magnitude of the maximum load on such mechanical component.

A further object is the provision of a three way drive for the pressure pump of an engine powered forwardly and reversely driving transmission in which, by means of the novel co-action of three one-way clutches, a positive geared drive to the pump is operative at all times regardless of whether the engine is idle or the forward or reverse drives are disconnected, so long as the transmission is at least caused to coast in forward or reverse motion due to drag from the load or in the alternative, the engine is set in motion with or without the transmission being in motion.

According to a feature of the pressure fluid controlled transmission of the present invention, a pair of spaced apart forward and reverse clutches is provided which, though coupled together in tandem, may be selectively fluid activated to establish the desired direction of drive and in a manner such that the bodily shift of one clutch into drive establishing engagement causes the other clutch to be shifted into a position positively isolated from frictional engagement. According to a further feature a valve regulated fluid system is provided for automatically controlling the rate of actuation of such fluid activated clutches as just described, in a progressive manner such that pressure fluid is first bled into one or the other of a pair of servo chambers provided for the thus activated clutches at a reduced rate so as to fill and charge the chambers without undue drain or shock to the system and second, full pressure is then applied to the servo chamber of the clutch desired for summarily activating the same; in addition the noted regulating valve for the fluid system serves in the dual capacity for not only filling and activating the clutch, but also in effecting an instantaneous full release of the pressure in the servo chamber thereof thereby facilitating a rapid clutch release action free from tendency to permit clutch drag.

Another object of the invention is to provide a cluster gear type of encased differential transmission for forwardly and reversely coupling together a first and a second axially aligned shaft in geared drives which are of identical speed ratios even though of opposite senses of rotation; in the accomplishment of such objective it is found that a rigid stationary carrier for the cluster gears is particularly advantageous, and a further object of the invention is the provision of a fluid loaded thrust bearing interposed in the transmission so as to conduct at least a substantial portion of the thrust reaction from at least one of the shafts directly to the rigid stationary carrier and thereby relieve the gears, bearings, and other moving parts of the transmission as well as a portion of the case, of some of the burden of serving as structurally loaded members. In the latter regard one or more portions of the transmission case may be made relatively light and, in the event that an abundant and cheap metal is used, reasonably inexpensive such that certain economies may be realized in manufacturing the housing which is employed for the transmission.

An additional object is the provision of a by-pass type hydraulic circulating system which includes series and parallel arranged intermittent and continuous fluid receiving devices and in which a pair of singly and dually functioning single valves co-acts to control the proper by-passing of fluid with respect to each of said devices; according to one feature of this hydraulic circulating system, one such valve constitutes a fluid pressure regulator acting primarily as a pressure releasing dump valve and, through the action of the other valve, certain of the fluid receiving devices draw on the thus-released dumped fluid as their sole source of fluid supply. In such fashion the latter devices function in their intended capacity as the sole result of fully utilizing the otherwise wasted energy of the fluid inherently necessarily dumped by the pressure regulator.

Further features, objects and advantages will either be specifically pointed out or become apparent when for a better understanding of the invention, reference is made to the following written description taken in conjunction with the accompanying drawings in which.

Figure 1:
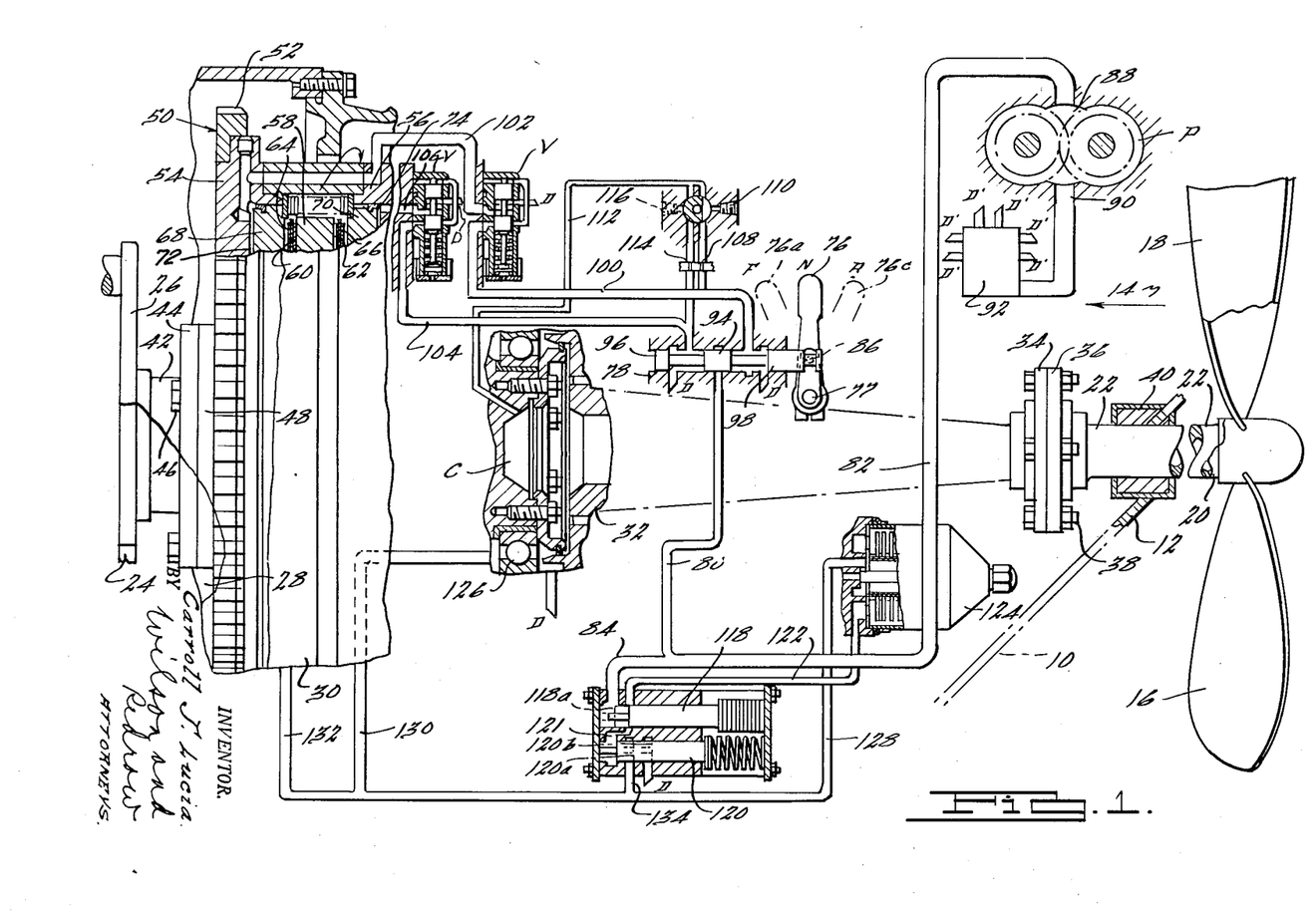
Fig. 1 is a combination schematic view of a pressure fluid controlled twin-screw type of marine drive mechanism in a neutral or non-drive position.

In Figure 1 a twin-screw power boat 10, selected as one illustrative environment to which the present invention may be applied, is shown as having a hull provided with a stern portion 12 and adapted for motion ahead in the water normally in the longitudinal direction of the arrow 14. The power boat 10 has a pair of transversely spaced apart screws or propellers 16, 18 mounted one at each side thereof at the stern. The propellers 16, 18 are preferably of the out-turning type ( i. e. the upper portions thereof turn outwardly when driving the boat ahead) and accordingly the near propeller 16 as viewed from Fig. 1 is a left handed propeller and the far propeller 18 is a right handed propeller, each being supported by a respectively associated propeller shaft 20 or 22. The boat 10 has a port engine 24 and a starboard engine 26 which may be of the diesel type and arranged generally side by side, with the port engine 24 being substantially longitudinally aligned with respect to the propeller shaft 20 of the near propeller 16 and the starboard engine being substantially longitudinally aligned with respect to the propeller shaft 22 of the far propeller 18. The port and starboard engines 24 and 26 are coupled to the corresponding propeller shafts 20, 22 by suitable means including a pair of substantially identical forwardly and reversely driving geared transmissions 28, 30 and a pair of propeller-connected shafts forming similar output shafts for the respective transmissions and one of which is shown at 32. The rear end of the shaft 32 is flanged at 34 and fastened to the propeller shaft 22 through the medium of a companion flange 36 formed on the latter and a set of bolts 38 passing through a plurality of registering openings provided in the flanges. The propeller shaft 22 passes rearwardly through a water tight stern tube 40 which is secured to the stern portion of the hull and which may be of conventional design.

As already noted the two transmissions 28, 30 are substantially identical to one another and in the interests of brevity only the far one 30 of the transmissions will be described particularly in detail. The transmission 30 is driven by the starboard engine 26 which has a crankshaft end portion 42 serving as the input shaft for the transmission. The end portion 42 of the starboard engine has a flange 44 fastened by two or more bolts 46 to a faced off hub portion 48 formed on a combined rotatable flywheel and clutch housing 50. The housing 50 has a set of starting gear teeth 52 mounted to the periphery thereof and includes a stack of three bolted together annular plates comprising an end plate 54 carrying the set of teeth 52, an opposite end plate 56, and an interposed central plate 58 having a smooth friction face 60 on one side and a corresponding friction face 62 on the other side. The friction faces 60 and 62 have a pair of frictionally engageable wear surface members 64, 66 respectively adjacent thereto and forming clutch disc ports, the members 64, 66 being mounted in the housing 50 so as to be readily shiftable axially as a unit and being independently rotatable with respect to one another and with respect to the housing 50, all as will hereinafter be more fully described. Each of the end plates 54, 56 is provided with an annular recess and a front pressure actuable piston 68 is receivably keyed in the recess for the plate 54 and a rear pressure actuable piston 70 is receivably keyed in the recess for the plate 56.

When viewed from a position astern of the propellers, the engines 24, 26 of the present illustrative example are assumed to be of the non-reversible type and to have a normal clockwise direction of rotation and the right handed propeller 18 as shown is arranged to drive the boat ahead when the propeller is driven in a clockwise direction. The rotatable clutches in the transmissions 28, 30 are independently rotated clockwise due to the clockwise rotation of the individual engines 24, 26 and when the front piston 68 is pressure actuated in the housing 50 the wear surface member 64 is clamped to the friction face 60 and caused to rotate clockwise and the propeller connected output shaft 32 is rotated, when viewed from astern of the propellers, in a clockwise direction due to the forward driving action of a cluster gear type of power train located in the transmission 30 as hereinafter more fully described.

The propeller 18 accordingly tends to drive the boat ahead. Alternatively, pressure actuation of the rear piston 70 and the resulting forced clockwise rotation of the wear surface member 66 causes the propeller output shaft 32 to be rotated in a counter-clockwise direction due to the reverse driving action of another power train provided by the just noted cluster gears of the transmission 30 and the propeller 18 tends to drive the boat astern.

The front piston 68 and the recess in the plate 54 cooperate to define a moving wall type working chamber 72 which is pressurizable to force the front piston 68 toward the friction face 60 so as to clamp the wear surface member 64 therebetween. Similarly, the rear piston 70 cooperates with the recess in the plate 56 to define a moving wall type working chamber 74 which is pressurizable to force the piston 70 in the direction of the friction face 62 so as to clamp the wear surface member 66 in drive establishing engagement therebetween. Selective pressurization of the working chambers 72, 74 is accomplished through the operation of a hydraulic control system which is operator operated by means of a valve controlling lever 76. The lever 76 has a neutral position shown by solid lines in Fig. 1 from which it is selectively manually shiftable into the forward drive position shown by the dotted lines 76a and into the rearward drive position shown by the dotted lines 76c. The lever 76 is keyed to a rock shaft 77 carrying another lever connected by a pin and guide connection 86 to a drive selector valve 78. The drive selector valve 78 controls the application of hydraulic pressures in the hydraulic system and is supplied by a pipe 80 which forms one branch of a pump discharge pipe 82 having another branch 84.

The pump discharge pipe 82 is connected to the pressure side 88 of a spur gear type of pump hereinafter more fully set forth in detail. The pump P is arranged to circulate oil, glycerine, or other suitably compounded lubricant or pressure fluid and under a predetermined regulated pressure of approximately 100 p. s. i. according to one physically constructed embodiment of the present illustrative example of the invention. The pump P has a suction side which is connected to an intake pipe 90 leading from a reservoir 92. The reservoir 92 is provided with a plurality of drain receiving lines D'. The drive selector valve 78 includes a spool type shiftable element adjustably positioned through action of the lever 76 and including a central land 94 and a pair of spaced apart end lands 96, 98. In the neutral position shown in Fig. 1 the central land 94 closes off the valve supply pipe 80, a drain line D adjacent the end land 96 is open, and a drain line D adjacent the end land 98 is open. Each of the drain lines D is connected to one of the drain lines D' provided on the reservoir 92.

A pipe 100 leads from the valve 78 to an automatic clutch control valve V which controls a drain line D connected to a drain line D' on the reservoir 92. The control valve V is rotatably connected to the clutch housing 50 and is pressure actuable so as to be automatically shiftable radially inwardly with respect thereto. The pressure existing in the pipe 100 is the combined pressure produced by the pump P and by the centrifugal acting force on the mass of oil in the radially extending components of the pipe 100 leading to the control valve V. Operation of the control valve V, hereinafter more completely set forth is such as to connect the pipe 100 to a pipe 102 leading to the working chamber 72 for the forward piston 68 in the rotating clutch housing 50. A pipe 104 is connected by an automatic clutch control valve V similar to the previously noted control valve V, to a pipe 106 leading to the working chamber 74 for the rear piston 70. The operation of the control valve V connected between the pipes 104 and 106 is such that in the position shown in Fig. 1, the pipe 106 freely communicates with a drain D connected to the valve and the pressure in the pipe 106 is fully released. The just noted drain D is connected to a drain D' located on the reservoir chamber 92. The pipe 100 is also connected by means of a passage 108 having a precalibrated restriction therein to the open side of a valve 110 through which pressure fluid is passed to a pipe 112 leading to a thrust opposing fluid container C. The pipe 104 has a passage 114 provided with a precalibrated restriction therein leading to the closed side of the valve 110 which if not in the closed position shown would place the passage 114 in communication with the pipe 112 leading to the fluid container C. The purpose of the restrictive effect of the passage 108 or 114 as the case may be, is to prevent sudden shock to the hydraulic system and temporary loss of back pressure therein whenever the operation is such as to call for filling the fluid container C.

The previously considered branch passage 84 leading from the pump discharge line 82 is connected by means of a pressure actuable single shiftable valve 118, a passage 121, and a pressure actuated single shiftable valve 120, to a drain line D adjacent the latter valve and connected to a suitable drain connection D' on the reservoir 92. The valve 118, which is spring biased at its rear end, is a pressure regulator serving as a pressure releasing dump valve to dump the pumped fluid not only into the passage 121 but also into a pipe 122 which leads to an oil filter 124. At those times in which the intermittently pressure actuated pistons 68 and 70 are being pressurized and then set in motion, the pressure movable valve 118 assumes a normally closed dotted line position shown by the dotted lines 118A in Fig. 1 due to the fact that there is a drop in pressure in the branch passage 80 and a consequent drop in pressure in the branch passage 84 until such time as the pump P can recover and replenish the fluid under appropriate pressure in the system. In normal operation, however, the valve 118 assumes the solid line intermediate position shown in Fig. 1 in which the pipe 122 and the pipe 121 are both restrictively connected to the branch passage 84, certain minor adjustments from such position being automatically compensated for by the valve 118 which is motion responsive to minor pressure fluctuations as well as major pressure fluctuations.

The transmission 30 includes a system of bearings such as at 126 which are hydraulically series connected with the oil filter 124 on the downstream side thereof by means of a pipe 128 and a series of individual branch pipes 130, 132. The bearing 126 and the other bearings are thus provided with filtered oil as schematically illustrated in Fig. 1 and are individually or collectively served with a drain D as shown which leads to a suitable drain connection D' on the reservoir 92.

It is apparent that the pipes 122 and 128 serve as the respective inlet and outlet of the oil filter 124 and that the passages 121 and 134 which are controlled by the valve 120 serve as a by-pass conduit for by-passing oil around the filter 124. The valve 120 serves as a pressure relief valve, being spring biased at its rear end and pressure actuated at the forward end which is exposed to oil pressure. In its intermediate dotted line position 120a shown by dotted lines in Fig. 1, the valve 120 completely by-passes the oil filter 124 but in normal operation may only partially cover or even fully cover the passage 134 so as to restrict or prevent such a by-passing effect. The former condition prevails when the filter 124 becomes progressively dirty and the latter condition prevails when the filter is clean or nearly so. It is only when the filter 124 becomes fully plugged that the valve 120 completely by-passes the same.

It will be noted that the drain passage D and the passage 134 adjacent the valve 120 are so arranged that when they are connected through the operation of the valve 120 the system of bearings in the engine is completely by-passed as in the instance the bearing 126. The position of complete by-pass for these bearings is shown by the dotted line position 120b for the valve 120. Such a drastic relief of pressure by the valve 120 would be necessary for example in the instance of completely plugged bearings or in the instance of an undue pressure of oil pressure being generated if only temporarily in the pressure system. When both of the valves 118 and 120 are fully open, the intermittently actuated clutch servo-chambers 72 and 74 controlled at 78 and the continuously served oil filter 124 and the system of bearings such as at 126 are completely by-passed. In normal operation, the flow path for all fluid from the branch passage 84 is through the pipe 122, through the filter 124, and through the pipe 128 to the various bearing feeding branches 130, 132 and thence into the bearings such as at 126 and to drain D; the valve 118 assumes an intermediate position as shown in solid lines Fig. 1 and regulates the back pressure in the fluid lines 84 and 80 at a magnitude of 100 pounds per square inch. On such basis, the companion dually functioning relief valve 120 is arranged to assume the intermediate position 120a so as to by-pass the oil filter 124 when the upstream pressure as in the passages 121 and 122 exceeds approximately 50 pounds per square inch; the valve 120 is arranged to assume the fully opened position 120b when the condition of the back pressure in the passages 122 and 121 is such that it exceeds approximately 60 pounds per square inch. The latter condition is an extreme condition and probably occurs only under the circumstances of a drastic surge in the hydraulic system or else due to a set of fully plugged bearings or at least a set of completely plugged spray jets therefor, not shown, which are usually used in conjunction with bearings of the type presently shown.

Figure 2:
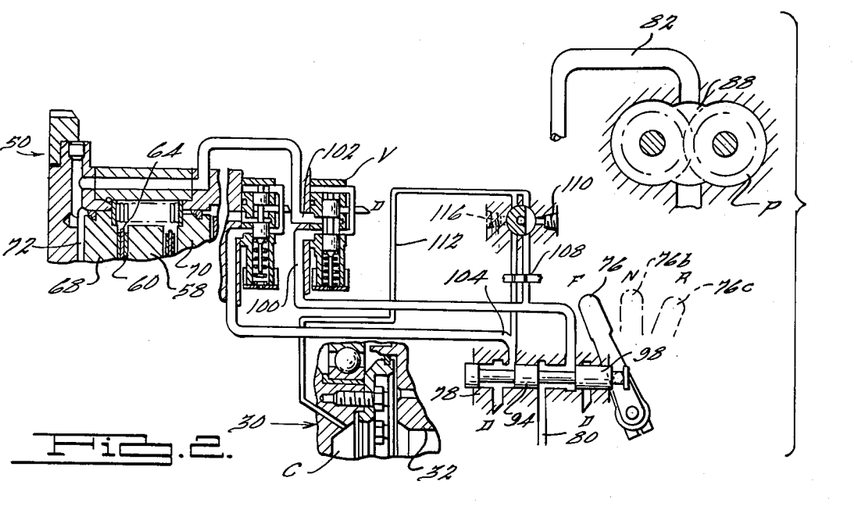
Figures 2 and 3 are fragmentary schematic views based on the showing of Fig. 1 and illustrating respectively the forward and reverse driving positions of the controls.
Figure 3:
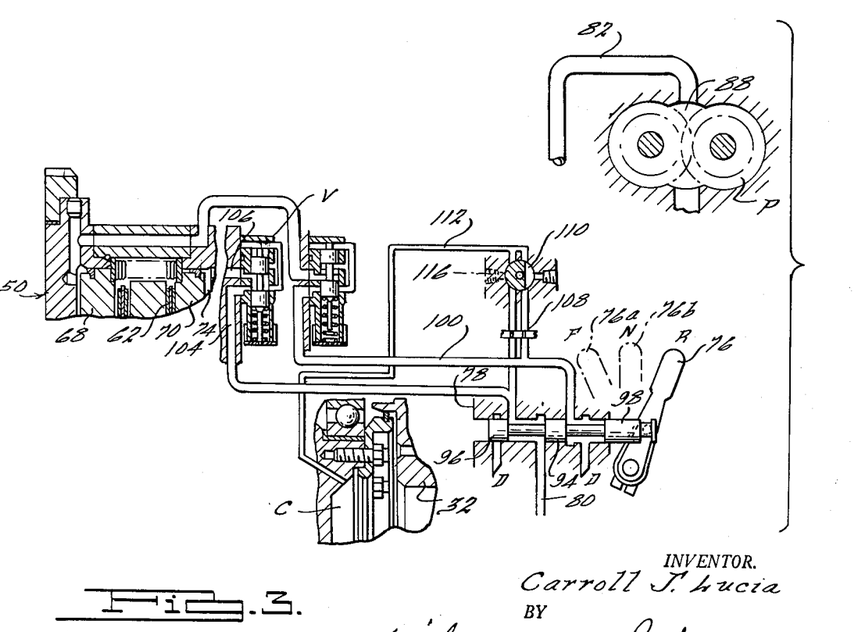

Reference may be had to Figures 2 and 3 for understanding of the operating positions of the transmission and controls of Fig. 1. In Fig. 2 particularly, the operator operated selector lever 76 is shown as having been advanced in the forward solid line position from the neutral position shown by the dotted lines 76b. The central land 94 in such instance uncovers the fluid supply pipe 80 for the selector valve 78 and establishes communication through the passage 100, the control valve V, and the passage 102 to the working chamber 72 adjacent the forward piston 68. Under the force of fluid pressure, the piston 68 is moved rearwardly so as to clamp the wear surface member 64 against the friction face 60 and cause forward drive to be established through the transmission 30. The end land 98 at the same time covers the drain D adjacent thereto whereas free communication from the pipe 104 to the drain D adjacent the land 96 is permitted. Pressure in the passage 100 is also communicated through the restricted conduit 108, and through the open side of the valve 110 to the passage 112 for communicating pressure fluid into the fluid container C at a pressure in proportion to the actuating pressure existing in the working chamber 72. Due to the pressure thrust in the fluid container C a proportional reaction force is exerted against the propeller connected output shaft 32 for the transmission 30. Full pump pressure from the pump discharge 88 may thus be effectively applied to the working chamber 72 and the fluid container C. The relationship of the intermittently acting fluid pistons 68, 70 and the control valve 78 therefor, the regulator and relief valves 118, 120, the oil filter 124 and the bearings supplied with the filtered oil is also fully described in my co-pending application Serial No. 368,197, filed July 15, 1953, and is claimed in such application.

In Fig. 3 the full line showing of the lever 76 corresponds to the reverse drive position for the transmission 30 and represents the extreme rearward position for the lever as compared with the forward position indicated by the dotted lines 76a and the neutral position indicated by the dotted lines 76b in Fig. 3. In such instance, the central land 94 on the shiftable valve element uncovers the inlet 80 for the control valve 78 and directs pressure fluid through the passage 104, through the control valve V, and through the passage 106 into the working chamber 74 behind the rear piston 70. At the same time the end land 96 covers drain line D adjacent thereto. The passage 100 is connected to drain through the drain D adjacent the end land 98 for the valve and accordingly pressure is released from the fluid container C and fluid passes through the passage 112, the open side of the valve 110, the restricted conduit 108, and the valve 78 to the drain D of the latter adjacent the end land 98. By way of comparing Figs. 2 and 3 it will be noted that in the forward position of the lever 76 the control valve V between the passages 100 and 102 is shown to be fully open whereas in the rearward position of the lever 76 the control valve V between the passages 104 and 106 is shown to be fully open. The fluid container C is pressurized only in the instance of forward drive as in Fig. 2 for reasons as are hereinafter more fully discussed. It will be apparent that if the valve 110 is shifted from the solid line position shown in Figs. 1, 2 and 3 into the counter-part dotted line position 116 of Fig. 1, the fluid container C will be pressurized when the valve is in the rear position as shown in Fig. 3 and will be connected to drain when in the forward position as shown in Fig. 2. It follows then that in order to convert the transmission 30 used with the right-handed propeller 18 on the starboard side of the boat into a transmission such as 28 suitable for portside use, it will merely be necessary to interchange a left handed propeller for the right handed propeller 18 and to shift the valve 110 into the dotted line position 116 shown in Fig. 1 wherein the open side of the valve registers with the restricted passage 114 and the restricted passage 108 is closed. It will be apparent in such instance that the ahead drive position for the controls will be such that the lever 76 occupies the dotted line position shown by dotted lines 76c in Fig. 1 and that the reverse drive position will be that of the dotted line position shown by dotted lines 76a in Fig. 1, and this description in fact constitutes an apt description of the portside transmission indicated at 28 in Fig. 1.

The importance of this interchangeability of transmissions cannot be too strongly emphasized inasmuch as all transmissions herein employed can be produced from one assembly line by the same assembly operations and thereafter adapted for either port or starboard side use merely by the selection of the appropriate right handed or left handed propeller and in the selection of the direction in which the handle for the valve 110 is placed such that its open side is exposed to the appropriate one of the two restricted conduits 108, 114.

Figure 5:
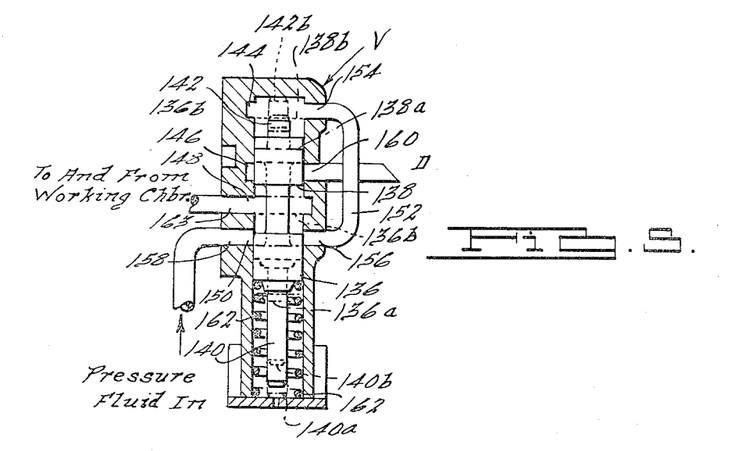
Figures 5 and 6 respectively show to an enlarged scale the automatic clutch control type valve of Figure 1 and a typical force diagram therefor to explain the valve behavior under varying speeds and pressures.

In Fig. 5 a typical clutch control valve V of the type used in two instances in Fig. 1 is shown drawn to an enlarged scale. The control valve V has a body which is chambered to provide a cylindrical bore in which a radially shiftable element slides, the element having a midportion of reduced diameter and two relatively centrally located spaced apart lands 136 and 138. At the radially inward extremity or bottom of the valve element a protruding stop 140 is provided and at the radially outwardly extremity or top another protruding stop 142 is provided. The bore of the body of the valve V contains a series of annular recesses 144, 146, 148 and 150. A side port 156 intersects the annular recess 150, another side port 154 intersects the annular recess 144 and the two ports 154, 156 are interconnected by means of a shuttle passage 152. The fluid pressure existing in an inlet port 158 which intersects with the annular recess 150 is thus constantly communicated to the annular recess 144 regardless of the valve position and is thus effective against the radially outermost or top end of the shiftable valve element at all times. The presence of pressure in the annular recess 144 tends to cause the shiftable valve element to slide radially inwardly until it is stopped and balanced due to the thrust of a spring 162 at the bottom or radially inner end of the valve element.

The first position of normally assumed travel is an intermediate one between two extremes of radial travel and, as shown in solid lines of Fig. 5, is a position such as to cause the upper land 138 to completely cover and close off the annular recess 146 and a drain port 160 served by a drain D continually connected to a drain D' on the reservoir tank 92 (Fig. 1). The land 136 only partially covers the recess 150 with which the valve inlet port 158 communicates and permits a restricted flow of pressure fluid to be bled past the reduced midportion of the valve into the annular recess 148 and an intersecting port 163 which is connected to the working chamber of the clutch controlled by the valve V. Due to the continuous escape of pressure fluid past the land 136 so as to bleed into and fill to completion the working chamber and the intermediate passages connected to the working chamber port 163, the pressure at 158 is automatically prevented from accumulating beyond a predetermined amount and any slight pressure surge is immediately accommodated by the slidable land 136 in moving with the valve further radially inwardly until stopped by the balancing effect of the spring 162. Once, however, that the filling process is completed and there is no room for further escape of the fluid at the predetermined reduced pressure from the outlet 158, the pressure builds up instantly and the shuttle passage 152 is immediately pressurized to a point at which the fluid pressure at the top of the radially shiftable valve element causes the element to be forced radially inwardly to the fully open position shown in dotted lines in Fig. 5 wherein the lower stop assumes the bottomed position 140a, the upper land assumes the position 138a, and the lower land assumes the fully open position 136a so as to admit full line pressure to the working chamber port 163 at the side of the body of the valve V.

In one physically constructed embodiment of the valve V shown in the present illustrative example of a transmission, a predetermined pressure of approximately 40 p. s. i. at the pump was selected as the critical pressure below which the valve element is caused to travel radially outwardly to the extreme fully releasing position wherein the upper stop assumes the corresponding bottomed position shown by the dotted lines 142b, the upper land assumes the fully opened position 138b permitting full release of pressure fluid in the working chamber port 163 and free drainage of the fluid therefrom through the drain port 160 and the drain D, and the lower land assumes the fully closed dotted line position 136b which prevents communication between the annular recesses 148 and 150. At the same time the lower stop assumes the dotted line position 140b. The actual magnitude of the critical predetermined pressure of operation of the control valve V in any one installation depends on a number of variables such as the rate of the spring 162, the masses of the shiftable valve element and the spring 162, and the mass and radial position of the fluid in the radially extending components in the lines such as 100 and 104 which are connected to the respective control valve V in Fig. 1.

Figure 6:
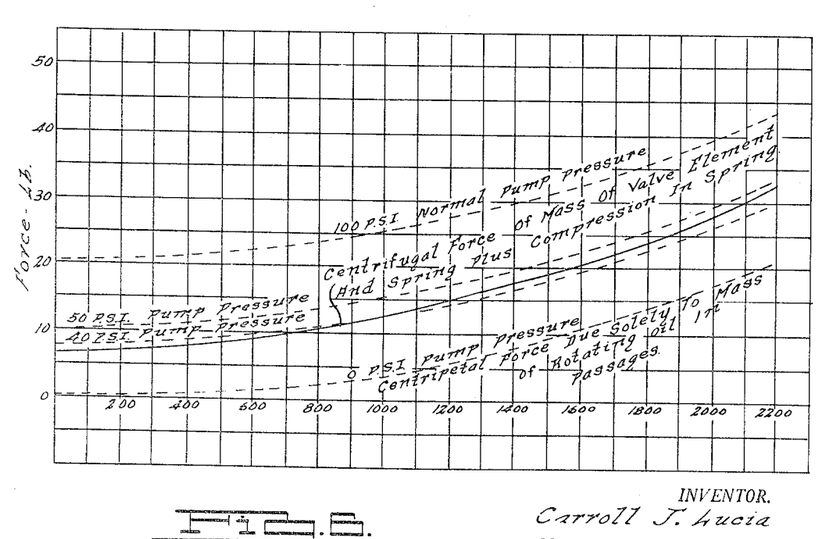

An operating graph is reproduced in Fig. 6 from which the behavior of the just noted physical valve embodiment can best be understood. On the graph a family of dotted line curves appears each of which has the same general characteristics except for the fact that they differ as to the pump pressure maintained at the source of pressure fluid for the control valve V. For instance, the lower most dotted curve is presented on the basis of 0 p. s. i. pump pressure such that the entire force acting on top of the shiftable valve element is a centripetal or inwardly directed force due to the centrifugal effects of the fluid filling the lines 100 and 104 of Fig. 1. The next two dotted line curves show the respective increases in the values of the centripetal forces acting against the valve V when pump pressures are 40 and 50 p. s. i. respectively and the uppermost dotted line curve represents the centripetal forces on the valve element tending to move it radially inwardly under the normal pump pressure of 100 p. s. i. On the other hand, the solid line curve on the graph represents the combined centrifugal force of the masses of the valve element and the spring 162 plus the compressive force in the spring 162, Fig. 5.

It will be noted that above approximately 1000 R. P. M. the solid line corresponding to centrifugal and radially outward forces lies above the dotted line centripetal force curve corresponding to 40 p. s. i. pump pressure, whereas below 1000 R. P. M. the 40 p. s. i. dotted line curve lies above the solid line centrifugal force curve. The advantages of such an arrangement can best be appreciated when it is realized that the magnitude of torque safely transmitted by a pressure actuated clutch depends upon the magnitude of the actuating pressure effective in the clutch and such pressure must be considerable (e. g. the 100 p. s. i. normal pressure of the present embodiment) during high-torque high-speed conditions of the propeller shaft. On the other hand at low speeds of the propeller shaft considerably less clutch applying pressure is necessary in order for the clutch safely to transmit the reduced torque of low speeds. By way of return to the graph of Fig. 6 it becomes manifest that, for instance at the transmission speed of 1600 R. P. M., the centrifugal force tending to open the valve V is in excess of the centripetally acting force corresponding to 40 p. s. i. pump pressure. At any time that the centrifugal force exceeds the centripetal force, the control valve V is caused to open fully and accordingly fully releases the pressure from the engaged clutch.

Inasmuch as low pressures if not automatically compensated for in the clutch are dangerous for the reason that they might permit the clutch to slip and burn up under a high-speed high-torque condition, the transmission through action of the control valve V disengages itself and remains disengaged so long as the speed of 1600 R. P. M. is maintained on the driving engine. The 40 p. s. i. pump pressure, however, is sufficient to hold the clutch safely engaged at relatively low speeds and in the event that the engine speed is reduced to 600 R. P. M. the condition prevails that the centripetal pressure exceeds the centrifugal and spring force on the valve element and the same can be safely shifted to a fully open position. Accordingly, at the lower speed of 600 R. P. M. ad by reason of the low torque to be dealt with, the clutch may be reengaged under the automatic control of the valve V and the engine and transmission operated under such reduced torque as an emergency measure at least until the normal 100 p. s. i. pump pressure can be restored to the system. It will be observed in Fig. 6 that, according to the normal pressure pump curve in dotted lines corresponding to 100 p. s. i., the normal applied pressures which are produced are more than adequate to hold the shiftable valve element in fully open position over the entire speed range of the engine and transmission.

Figure 4:
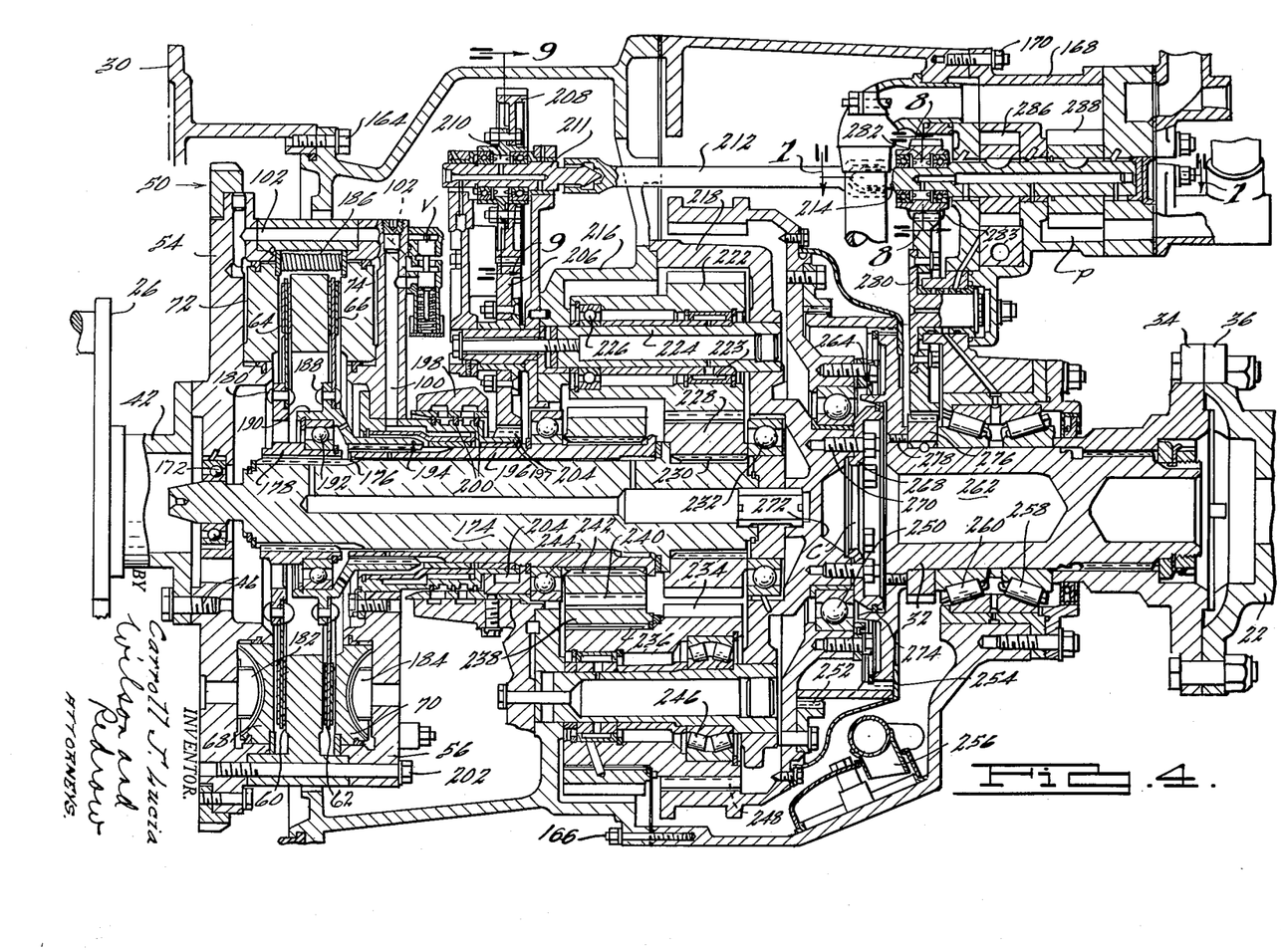
Figure 4 is a longitudinal sectional view showing in detail the transmission fragmentarily represented in the drive mechanism of Figure 1.

In Figure 4, the transmission 30 which is drivingly connected to the rear end portion 42 of the starboard engine 26 will be seen to have a case of three part construction of which the first two parts are bolted together by a plurality of fasteners 164 and the last part of which is fastened to the rear of the first two parts by means of a plurality of bolts 166. At the back of the last part of the transmission case, a separate case 168 for the pump P is fastened by means of a plurality of bolts 170. The crankshaft rear portion 42 is journalled for rotation in a rear main bearing, not shown, and thus provides a fixed central axis of rotation for the rotatable clutch housing 50. The forward plate 54 in the rotatable clutch housing 50 is formed with a central hub in which an anti-friction ball bearing 172 is located and in which the reduced end of an inner main shaft 174 is piloted. The inner shaft 174 carries a clutch hub 178 made fast thereto by means of a set of splines 176 which permits splined axial shift of the clutch hub 178 with respect to the inner shaft 174. The clutch hub 178 has a radially extending flange to which a clutch disk is riveted as by one or more rivets 180 and the clutch disk in turn carries the previously noted wear surface member 64 which is constituted by wet type disk clutch facings.

As previously noted, the wear surface member 64 is arranged to be moved and clamped by the annular piston 68 which is splined by bolts at three or more places such as at 182 to the clutch housing plate 54 so as to prevent relative rotation from occuring between the piston 68 and the rotatable clutch housing 50. Similarly, three or more spline bolt members 184 are provided for preventing relative rotation between the rear piston 70 and the rear clutch housing plate 56. A plurality of clutch piston biasing means 186 such as preloaded coil springs is provided for continually acting to spread apart the pistons 68 and 70 and keep the same separated from the wear surface members 64, 66 and the friction faces 60, 62 there adjacent. The wear surface member 66 may likewise be a wet type of disk clutch facing material and is carried by a clutch disk which is riveted as at 188 to a clutch hub 190 disposed in telescoped relationship with the respect to the already described clutch hub 178. An anti-friction ball bearing means 192 is provided between the hubs 178 and 190 to provide for relative rotation but at the same time to act as a thrust bearing to prevent any relative axial movement from occurring between the hubs 178 and 190. The hub 190 has a sleeve like rear portion 194 splined to an outer main shaft 196 which telescopically receives the inner main shaft 174. The splines between the sleeve portion 194 and the outer shaft 196 permit slight axial shift to occur between the two named members and corresponding to the axial shift permitted by the splines 176. A stationary type of manifold distribution structure 198 is provided which has connections, not shown, leading from the selector valve 78 of Fig. 1 and which together with a plurality of rotating seals 200 cooperates to form a rotating seal type of joint for conducting fluid selectively from the valve 78 to the working chambers 72 and 74.

Thus from the outer side of the stationary structure 198, pressure fluid is conducted fluid tight between the seals 200 and through the radially extending passage 100 formed in the sleeve 197 on the clutch housing 50 and into the control valve V which controls the passage of fluid through the pipe 102 into the working chamber 72. Only one of the control valves V is shown in Fig. 4 and only one set of passages 100, 102, is shown and these passages are used solely in conjunction with the working chamber 72. The other valve V and its associated passages 104, 106 are out of plane and do not appear in the showing of Fig. 4. The forward and rear plates 54, 56 for the rotatable clutch housing 50 are bolted together at several places as at 202. The sleeve 197 on the clutch housing 50 drivingly carries a set of spur gear teeth 204 which mesh with a spur gear 206 and the latter gear 206 is constantly in mesh with another gear 208. Whenever the starboard engine 26 is running the just noted gear 208 is caused to be positively driven thereby.

A one-way clutch of the sprag type indicated at 210 connects the gear 208 to a shaft 211 which is splined to an axially aligned shaft 212 and the latter shaft drives a pump shaft 214 located in the pump P. The center part of the stationary transmission case includes a radially inwardly extending portion 216 which cooperates with a bell shaped stationary member 218 to define a fixed carrier of the three cluster type for the transmission. The three clusters are circumferentially spaced at 120° from one another and each contains a pair of meshing gears of which a simple pinion such as at 222 forms one member of each pair and is set on a roller bearing 223 for rotation about a sleeved pin 224 fixed in the carrier. An anti-friction ball bearing 226 is provided for taking the thrust from the pinion 222 of each of the three clusters. The pinion 222 of each pair of gears of the three clusters is continually in mesh with a sun gear 228 which is splined at 230 to the inner main shaft 174. The sun gear 228 is free to seek its own center within the three fixed gear clusters so as to equalize the tooth load against the teeth of the pinions 222 and has a radially shiftable anti-friction ball bearing 232 for absorbing axial thrust in the sun gear 228. The other pinion of each pair of members in each of the three gear clusters is constituted by a compound pinion having a portion 234 in continuous mesh with the pinion 222 of the pair and having another portion 238 in continual mesh with a sun gear 240 which is splined at 242 to the outer main shaft 196. The two portions 234 and 238 are splined together as at 236 and rotate as a unit. The sun gear 240 has a radially shiftable anti-friction ball bearing 244 provided there adjacent for taking the thrust reaction thereof and is arranged to be driven by the outer shaft 196 and the housing 50 at such time as the wear surface member 66 is engaged for driving the boat astern. The pinion portions 238 of the compound pinion forming one member of each pair of three cluster gears is arranged to center the sun gear 240 such that the sun gear seeks a position in which the tooth load on all of the portions 238 is approximately the same.

A spherical type thrust bearing 246 is provided for absorbing the thrust reaction from the compound pinion portions 238, 234. In addition to meshing with the short pinion 222, the portion 234 of the compound pinion is continuously in mesh with a ring gear 248 which is journalled for relative rotation with respect to the bell shaped member 218 by an anti-friction ball bearing means 250. By a series of axially shiftable splines 252 and 254 the ring gear 248 is drivingly connected to the propeller connected shaft 32 which forms the output member of the transmission 30.

In one physically constructed embodiment of the present illustrative example of the invention, the sun gear 240 was a right handed helically formed gear having 33 teeth; the portion 238 of the compound pinion gear was a left handed helically formed gear having 33 teeth; the sun gear 228 was a left handed helically formed gear having 33 teeth, the simple pinion 222 was a right handed helically formed gear having 27 teeth; the portion 234 of the compound pinion gear was a left handed helically formed gear having 33 teeth; and the ring gear 248 was a left handed helically formed internal gear having 105 teeth.

In the astern driving position of the transmission herein the wear surface member 66 is engaged and the direction of drive through such physically constructed embodiment was through the outer shaft 196, the sun gear 240, the portion 238 and the portion 234 of compound pinion and thence through to the ring gear 248 with a resulting reversal of drive of ratio 1:3.18. In the ahead driving position in which the wear surface member 64 is engaged, the path of drive through such physically constructed embodiment was through the inner shaft 174, the sun gear 228, the simple pinion 222, the portion 234 of the compound pinion and into the ring gear 248 with a resulting forward drive ratio of 1:3.18. Thus the forward and reverse drives are reduction drives of the same identical ratios albeit of opposite senses of rotation. Further, when the astern driving engagement prevails as for instance at 2000 R. P. M., the feed back drive through 234, 222, 228, and 174 to 64 causes the latter member 64 to be rotated at 2000 R. P. M. in the opposite direction from the engaged member 66 and vice versa. Thus, the relative speed of rotation is twice that of the input speed to the transmission. This fact alone points up to the desirability of the previously noted feature wherein clutch hubs 178, 190 are connected for synchronized axial movement together. When either of the members 64, 66 is shifted axially into engaged drive position, the other member is simultaneously shifted into a non-contacting position exactly centered in the space between the adjacent one of the pistons 68 or 70 and the associated friction face both of which are rotating relatively to the said other member at twice crankshaft speed. When neither of the members 64, 66 is engaged, they occupy a position of closely spaced adjacency closer to the appropriate friction face than to the adjacent piston 68 or 70.

The three part case for the transmission 30 is arranged to be of the dry sump type and has a sump suction assembly 256 provided in the rear of the transmission case. A thrust bearing 258 for taking forward thrust from the propeller connected shaft 32 and a thrust bearing 260 for taking the reverse thrust in the propeller connected shaft 32 form a span of mechanical tapered roller thrust bearings in the rear end of the transmission case. The propeller connected shaft 32 has an axially extending recess 262 in the end thereof which carries an integral axially extending cylindrical flange 264. The cylindrical flange 264 defines an annular recess in which there fits a companion member 268 which is fastened to the bell shaped stationary member 218 by means of three or more bolts 270 and which is stationarily carried thereby.

The bell shaped member 218 is formed with an axially extending hollow portion 272 and together with the member 268, the cylindrical flange 264, and the axial recess 262 forms a fluid container C which operates as a hydraulically loaded fluid thrust bearing.

Already considered in connection with the operation of the hydraulic controls in Fig. 1, the fluid container C is arranged to act in conjunction with the span of tapered roller bearings 258, 260 to reduce the loads thereon. In one physically constructed embodiment of the present illustrative example of the invention, the fluid container C was arranged to be pressurized at a full pressure of 100 p. s. i. and to have an area such that the thrust produced thereby at full pressure was 3000 lbs. in an axial direction toward the propeller. The calculated maximum propeller thrust was 5400 lbs. which without the supplemental effort of the fluid container C would load the rollers 258 in forward thrust to a load of 5400 lbs. and cause a slight compressive axial thrust to occur in the bearing 258. However, due to the assistance of the 3000 lb. thrust in the fluid container C the bearing 258 was unloaded to the extent of having to resist only the net difference in thrust of 2400 lbs., the bearing 260 for the rearward thrust being unloaded under such circumstances. The rated speed for 5400 lbs. propeller thrust was 2000 R. P. M. for the engine and it was graphically determined that at about 1500 R. P. M. the propeller thrust was reduced to about 3000 lbs. which was exactly equal and opposite to the fluid force due in the fluid container C. In such instance, neither bearing 258 nor 260 was subjected to any load.

Under conditions of speeds below 1500 R. P. M. at which the 3000 lb. thrust in the fluid container C was in excess of the forwardly acting propeller thrust, the excess of thrust due to the hydraulic fluid was resisted by the tapered roller bearing 260 and may have theoretically approached a magnitude of 3000 lbs. whereas at the same time the tapered roller bearing 258 was free from load.

As the magnitude of the propeller thrust varies from time to time during the normal maneuvering and operation of the boat, the seal 274 slides very slightly relative to the cylindrical flange 264, which latter moves with slight axial movement with the propeller connected shaft 32 as the shaft adjusts itself relative to the bearings 258, 260. The fluid container C is thus slightly axially collapsible and expansible and when pressurized expands in progressive stages so as partially to unload the bearing 258 under propeller thrust conditions which are in excess of 3000 lbs., expands farther to unload the mechanical thrust bearing of all load at 1500 R. P. M. and expands slightly more at speeds lower than 1500 R. P. M. such that the bearing 258 is free from all load and the bearing 260 for the rearward thrust is loaded to varying degrees. All such movement however, is virtually imperceptible.

The propeller connected shaft 32 of Fig. 4 drivingly carries a gear 276 which is continually in mesh with an offset spur gear 280. The spur gear 280 in turn meshes with another spur gear 283 which through the medium of a one-way sprag clutch 282 is drivingly connected to the pump input shaft 214.

Figure 7:
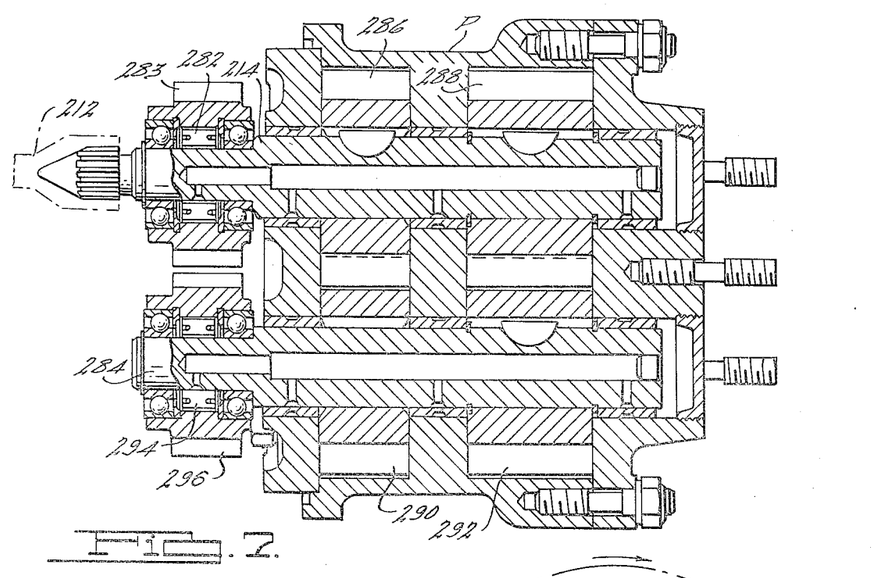
Figures 7, 8 and 9 are views taken on the section lines 7—7, 8—8 and 9—9 of Figure 4.
Figures 8, 9:
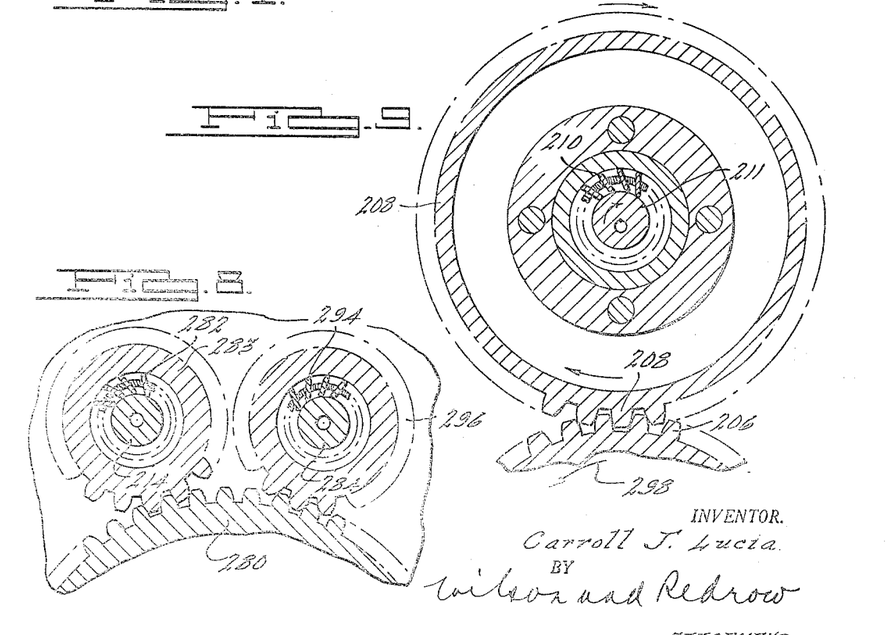

The pump input shaft drives the pump P, best seen in Figs. 7 and 8. The pump P includes not only the input shaft 214 which is journalled in the case thereof and driven through the one-way clutch 282 and the spur gear 283, but also a contra-rotating shaft 284 which is journalled in the case for the pump P. The shaft 214 carries a small and a large rotor 286, 288 fast thereto and the shaft 284 carries a small and a large rotor 290, 292 fast thereto. The small rotors 286, 290 carry sets of intermeshing teeth and together form a gear type sump pump. The large rotors 288, 292 carry intermeshing teeth and together form a spur gear main pump. A one-way sprag clutch 294 is provided for driving the shaft 284 by means of a spur gear 296 opposite to the gear 283. The gears 283 and 296 do not mesh with one another and the drive from the shaft 284 to the shaft 214 and the drive from the shaft 214 to the shaft 284 is a synchronized drive provided solely by the intermeshing action between the small rotors 286, 290 and the large rotors 288, 292. The small rotors 286, 290 are arranged to have a split intake connection, not shown, leading from the sump suction assembly 256 of Fig. 4 and from certain ones of the drain lines D of Fig. 1 and is further arranged to have an outlet connection, not shown, leading to one or more of the connections D' for the reservoir 92 of Fig. 1.

The main pump rotors 288, 292 are supplied from the intake line 90 leading from the reservoir 92, Fig. 1, and have the discharge connection 82 leading to the branches 80 and 84 in Fig. 1. As particularly shown in Fig. 8, the one-way sprag clutches 282 and 294 are of opposite hand with respect to one another. The result is that when the driving gear 280 is rotating in a clockwise direction corresponding to a head drive, the drive is transferred to the gear 296 through the one-way sprag clutch 294 and into the pump shaft 284. On the other hand, when the gear 280 is rotating counter-clockwise corresponding to astern drive for the boat, the gear 283 rotating clockwise drives the pump shaft 214 through the action of the intervening one-way sprag clutch 282. It will be appreciated then that during either direction of rotation of the propeller connected shaft 32 the pump P is availed of a source of positive geared drive.

In Fig. 9, it will be seen that the gear 206 is normally rotated in a clockwise direction 298 due to the counter-clockwise rotation caused to be assured by the sleeve 197 on the clutch housing 50 which, will cause the gear 208 to assume clockwise rotation so as to drive the shaft 211 in a clockwise direction and will therefore make available a positive drive to the pump P from the engine at any time of engine operation regardless of whether the propeller connected shaft 32 is rotating or not. Accordingly, by means of the inter-action of the three one-way clutches 210, 282 and 294, the pump P is positively driven to provide pressure fluid for operating the clutches and otherwise lubricating the bearings so long as the transmission is at least caused to coast in forward or reverse motion due to drag from the propeller-load or in the alternative, the engine is set in motion with or without the transmission being in motion.

The relationship of the gear train 204, 206, 208, the train 276, 280, 283, and the previously mentioned speed ratio reduction in the transmission 1:3.18 is such that when the transmission is engaged, the speed of rotation of the gear 208 and the shaft 211 is in excess of the speed of rotation of the gear 283 whereupon the one-way clutch 282 permits the shaft 214 to overrun the gear 283. In such instance the shaft 284, Fig. 8 is rotating in an opposite direction from the gear 296 with the sprag clutch 294 permitting such relative rotation to occur. In one physically constructed embodiment of the present illustrative example of the invention, the shaft 212 for driving the pump P was rotated through the gear train 204, 206 and 208, at a speed substantially equal to or slightly below engine speed whereas the speed reduction of 1:3.18 accomplished through the cluster planetary gear type transmission and a speed increase of 2.63:1 through the gear 276, the gear 280, and the gear 283 was such that a net step down ratio of approximately 1:1.21 resulted. Accordingly, when the propeller connected shaft 32 was the driving member for the pump P a slightly less advantageous ratio was available than when the engine 26 was the driving member for the pump P through the gear 204 whereby a substantially 1:1 speed ratio prevailed.

Variations within the spirit and scope of the invention described are equally comprehended by the foregoing description.

What is claimed is:

1. Marine drive mechanism comprising, in combination, a drive shaft, a reversible propeller-connected shaft coaxial therewith, and having means forming a recess at the relatively inner end of the propeller-connected shaft, transmission means for providing at least two power trains of the same speed ratio but of opposite directions of geared drive between said shafts, and including a pair of pressure-actuated units each effective to establish a different power train from the other, said transmission means incorporating compound gear clusters and having two input portions, a friction element carried by each said input portion and engageable under the influence of an appropriate pressure-actuated unit, and a pinion carrier for the gear clusters disposed adjacent the recessed end of the propeller-connected shaft and supporting a companion member to the recess means cooperating with the latter to define a fluid container subject to minor volume changes so as to be slightly expansible and collapsible, means including operator-operated drive selector means forming separately controlled passages for communicating fluid pressure to either of said pressure-actuated units as desired to actuate the same, and means of communication between said fluid container and one of the named passages for applying pressure in proportion to the actuating pressure existing in the corresponding unit, to the fluid container to expand the same in a direction to oppose reaction thrust in the propeller-connected shaft.

2. Marine drive mechanism comprising in combination, a drive shaft, a reversible propeller-connected shaft coaxial therewith, and having means forming a recess at the relatively inner end of the propeller-connected shaft, transmission means for providing at least two power trains of the same speed ratio but of opposite directions of geared drive between said shafts, and including a pair of pressure-actuated units each effective to establish a different power train from the other, said transmission means incorporating compound gear clusters and having two input portions, a disk clutch assembly associated with the pressure-actuated units and capable of limited axial movement, said clutch assembly having telescopically overlapping clutch hubs connected one to each input portion and each being axially fast with but relatively rotatable with respect to the other, a friction disk drivingly carried by each hub in spaced apart relationship to the other disk and movable under a drive establishing friction engagement with the corresponding pressure-actuated unit to cause the clutch assembly bodily to shift and maintain the other disk in a non-contacting position within a predetermined isolated space, and a pinion carrier for the gear clusters disposed adjacent the recessed end of the propeller-connected shaft and supporting a companion member to the recess means and cooperating with the latter to define a fluid container subject to minor volume changes so as to be slightly expansible and collapsible, means including operator-operated drive selector means forming separately controlled passages for communicating fluid pressure to either of said pressure-actuated units as desired to actuate the same, and means of communication between said fluid container and one of the named passages for applying pressure in proportion to the actuating pressure existing in the corresponding unit, to the fluid container to expand the same in a direction to oppose reaction thrust in the propeller-connected shaft.

3. Marine drive mechanism comprising, in combination, a drive shaft, a reversible propeller-connected shaft coaxial therewith, and having means forming a recess at the relatively inner end of the propeller-connected shaft, transmission means for providing at least two power trains of the same speed ratio but of opposite directions of geared drive between said shafts, and including a pair of pressure-actuated units drivingly connected to the drive shaft for rotation therewith and each effective to establish a different power train from the other, said transmission means incorporating compound gear clusters and having two input portions, a clutch element carried by each of said input portions and engageable with the drive shaft through an appropriate pressure-actuated unit, and a pinion carrier for the gear clusters disposed adjacent the recessed end of the propeller-connected shaft and supporting a companion member to the recess means and cooperating with the latter to define a fluid container subject to minor volume changes so as to be slightly expansible and collapsible, means forming separate passages leading to each of the pressure-actuated units, drive selector means effective to cause pressure fluid to be introduced from a source of pressure into each of the just named passages selectively to actuate the corresponding pressure-actuated unit, each said unit having a single radially shiftable valve means rotatable therewith and constituting the sole automatic valve control for the admission and release of internal pressure necessary to charge and actuate the same, each said single valve means being pressure movable under centripetally acting pressure-fluid-pressure to travel from a relatively radially outward position effective for fully releasing internal pressure on the corresponding unit to a relatively radially inward position effective for freely admitting fluid under actuating pressure thereto, and having a relatively intermediate position of travel assumed from the relative outward position in response to predetermined intermediate pressures of a magnitude varying inversely with respect to drive shaft speed, for charging the corresponding unit with fluid at a restricted rate, and means of communication between said fluid container and one of the named passages for applying pressure in proportion to the actuating pressure existing in the corresponding unit, to the fluid container to expand the same in a direction to oppose reaction thrust in the propeller-connected shaft.

4. Marine drive mechanism comprising, in combination, a drive shaft, a reversible propeller-connected shaft coaxial therewith, and having means forming a recess at the relatively inner end of the propeller-connected shaft, transmission means for providing at least two power trains of the same speed ratio but of opposite directions of geared drive between said shafts, and including a pair of pressure-actuated units each effective to establish a different power train from the other, said transmission means incorporating compound gear clusters and having two input portions, a friction element carried by each said input portion and engageable under the influence of an appropriate pressure-actuated unit, and a pinion carrier for the gear clusters disposed adjacent the recessed end of the propeller-connected shaft and supporting a companion member to the recess means and cooperating with the latter to define a fluid container subject to minor volume changes so as to be slightly expansible and collapsible, means forming separate passages leading to each of the pressure-actuated units, drive selector means effective to cause pressure fluid to be introduced from a source of pressure into each of the just-named passages selectively to actuate the corresponding pressure-actuated unit, each said unit having a single shiftable valve means constituting the sole automatic valve control for the admission and release of internal pressure necessary to charge and actuate the same, each said single shiftable valve means being pressure movable into an intermediate position for internally charging the corresponding unit with fluid at a restricted rate and having positions one on each side of the intermediate position effective for fully releasing internal pressure therein and for freely admitting pressure fluid respectively under influence of pressures below and above the charging pressure, and means of communication between said fluid container and one of the named passages for applying pressure in proportion to the actuating pressure existing in the corresponding unit, to the fluid container to expand the same in a direction to oppose reaction thrust in the propeller-connected shaft.

5. Marine drive mechanism comprising, in combination, a drive shaft, a reversible propeller-connected shaft coaxial therewith, and having means forming a recess at the relatively inner end of the propeller-connected shaft, transmission means for providing at least two power trains of the same speed ratio but of opposite directions of geared drive between said shafts, and including a pair of pressure-actuated units each effective to establish a different power train from the other, said transmission means incorporating compound gear clusters and having two input portions, a friction element carried by each said input portion and engageable under the influence of an appropriate pressure-actuated unit, and a pinion carrier for the gear clusters disposed adjacent the recessed end of the propeller-connected shaft and supporting a companion member to the recess means and cooperating with the latter to define a fluid container subject to minor volume changes so as to be slightly expansible and collapsible, a pair of contra-rotating gears establishing cooperation to form a unidirectional pumping source of fluid under pressure, a drive-shaft-connected first gear associated with one said pumping gear and each having a one-way clutch portion connected thereto and engageable to establish a non-return drive from the former to the latter, a second pair of gears drivingly connected to the propeller-connected shaft for synchronized rotation in a common direction and being associated with the pair of contra-rotating pumping gears in a manner such that one gear of each pair has a one-way clutch portion connected thereto and engageable to establish a non-return drive in one direction to the just-named one of the contra-rotating pumping gears, the other gear of each pair having a one-way clutch portion connected thereto and engageable to establish a non-return drive in the opposite direction to the other pumping gear, means including a drive-selector control member forming separately controlled passages between the pressure fluid pumping source and the respective pressure-actuated units for selectively communicating pressure fluid to either of the latter as desired to actuate the same, and means of communication between said fluid container and one of the named passages for applying pressure in proportion to the actuating pressure existing in the corresponding unit, to the fluid container to expand the same in a direction to oppose reaction thrust in the propeller-connected shaft.

6. A pressure-fluid system for controlling the operation of a cluster gear type of differential transmission means having two input portions and an output portion for transmitting forward and reverse geared drive between a source of prime power and a reversible load connected shaft, said differential transmission means incorporating dual gear sets and comprising a pair of sun gears, one connected to each of said input portions, a ring gear connected to said output portion, a thrust-reaction-absorbing carrier fixed in a disposition of generally adjacent relationship with respect to the load-connected shaft such that the respective adjacent end surfaces thereof define a predetermined space, and compound gear clusters rotatably carried by said carrier and establishing continuous geared drive between the ring gear and each of the sun gears; a pair of forward and reverse pressure-actuated units having pressure engaged clutches effective for frictionally coupling each of the transmission input portions to the source of prime power for synchronized rotation therewith, means including operator-operated drive selector means forming separately controlled passages for communicating fluid pressure to either of said pressure-actuated units as desired to actuate the same in the establishment of different power trains, means intermediate the load-connected shaft and the carrier and sealingly closing the aforesaid space therebetween to define a closed slightly expansible container for a pressurizable body of fluid for transmitting reaction thrust from the former to the latter, and means of communication between one of the named passages and said fluid container for pressurizing the body of fluid therein at a pressure in proportion to the actuating pressure existing in the corresponding pressure-actuated unit.

7. A pressure-fluid system for controlling the operation of a cluster gear type of differential transmission means having two input portions and an output portion for transmitting forward and reverse geared drive between a source of prime power and a reversible-load-connected shaft, said differential transmission means incorporating dual gear-sets and comprising a pair of sun gears, one connected to each of said input portions, a ring gear connected to said output portion, a thrust-reaction-absorbing carrier fixed in a disposition of generally adjacent relationship with respect to the load-connected shaft such that the respective adjacent end surfaces thereof define a predetermined space, and compound gear clusters rotatably carried by said carrier and establishing continuous geared drive between the ring gear and each of the sun gears; a pair of forward and reverse pressure-actuated units drivingly connected to the source of prime power and having a clutch assembly associated therewith and capable of limited axial movement, said clutch assembly comprising telescopically related hubs connected one to each input portion and each being axially fast with but independently rotatable relative to the other, and a friction disk drivingly carried by each hub in spaced apart relationship to the plane of the other disk and movable under a drive-establishing friction engagement with a corresponding pressure-actuated unit to cause the clutch assembly bodily to shift and maintain the other disk in an axially isolated position absent from frictional contact, means including operator-operated drive selector means forming separately controlled passages for communicating fluid pressure to either of said pressure actuated units as desired to actuate the same in the establishment of different power trains, means intermediate the load-connected shaft and the carrier and sealingly closing the aforesaid space therebetween to define a closed slightly expansible container for a pressurizable body of fluid for transmitting reaction thrust from the former to the latter, and means of communication between one of the named passages and said fluid container for pressurizing the body of fluid in the latter at a pressure of a magnitude corresponding to the actuating pressure existing in the corresponding pressure-actuated unit.

8. A pressure-fluid system for controlling the operation of a cluster gear type of differential transmission means having two input portions and an output portion for transmitting forward and reverse geared drive between a source of prime power and a reversible load-connected shaft, said differential transmission means incorporating dual gear sets and comprising a pair of sun gears, one connected to each of said input portions, a ring gear connected to said output portion, a thrust-reaction-absorbing carrier fixed in a disposition of generally adjacent relationship with respect to the load-connected shaft such that the respective adjacent end surfaces thereof define a predetermined space, and compound gear clusters rotatably carried by said carrier and establishing continuous geared drive between the ring gear and each of the sun gears: a pair of forward and reverse pressure-actuated units drivingly connected to the source of prime power, said pressure-actuated units having clutch members associated therewith and carried by different ones of said input portions and engageable with the source of prime power through an appropriate pressure-actuated unit, means forming separate passages leading to each of the pressure-actuated units, drive selector means effective to cause pressure fluid to be introduced from a source of pressure into each of the just named passages selectively to actuate the corresponding pressure-actuated unit, each said unit having a single radially shiftable valve means rotatable therewith and constituting the sole automatic valve control for the admission and release of internal pressure necessary to charge and actuate the same, each said single valve means being pressure movable under centripetally acting pressure-fluid-pressure to travel from a relatively radially outward position effective for fully releasing internal pressure on the corresponding unit to a relatively radially inward position effective for freely admitting fluid under actuating pressure thereto, and having a relatively intermediate position of travel assumed from the relative outward position in response to predetermined intermediate pressures of a magnitude varying inversely with respect to drive shaft speed, for charging the corresponding unit with fluid at a restricted rate, means intermediate the load-connected shaft and the carrier and sealingly closing the aforesaid space therebetween to define a closed slightly expansible container for a pressurizable body of fluid for transmitting reaction thrust from the former to the latter, and means of communication between one of the named passages and said fluid container for pressurizing the body of fluid therein at a pressure in proportion to the actuating pressure existing in the corresponding pressure-actuated unit.

9. A pressure-fluid system for controlling the operation of a cluster gear type of differential transmission means having two input portions and an output portion for transmitting forward and reverse geared drive between a source of prime power and a reversible load-connected shaft, said differential transmission means incorporating dual gear sets and comprising a pair of sun gears, one connected to each of said input portions, a ring gear connected to said output portion, a thrust-reaction-absorbing carrier fixed in a disposition of generally adjacent relationship with respect to the load-connected shaft such that the respective adjacent end surfaces thereof define a predetermined space, and compound gear clusters rotatably carried by said carrier and establishing continuous geared drive between the ring gear and each of the sun gears; a pair of forward and reverse pressure-actuated units having pressure engaged clutches effective for frictionally coupling each of the transmission input portions to the source of prime power for synchronized rotation therewith, means forming separate passages leading to each of the pressure-actuated units, drive selector means effective to cause pressure fluid to be introduced from a source of pressure into each of the just-named passages selectively to actuate the corresponding pressure-actuated unit, each said unit having a single shiftable valve means constituting the sole automatic valve control for the admission and release of internal pressure necessary to charge and actuate the same, each said single shiftable valve means being pressure movable into an intermediate position for internally charging the corresponding unit with fluid at a restricted rate and having positions one on each side of the intermediate position effective for fully releasing internal pressure therein and for freely admitting pressure fluid respectively under influence of pressures below and above the charging pressure, means intermediate the load-connected shaft and the carrier and sealingly closing the aforesaid space therebetween to define a closed slightly expansible container for a pressurizable body of fluid for transmitting reaction thrust from the former to the latter, and means of communication between one of the named passages and said fluid container for pressurizing the body of fluid therein at a pressure in proportion to the actuating pressure existing in the corresponding pressure-actuated unit.

10. A pressure-fluid system for controlling the operation of a cluster gear type of differential transmission means having two input portions and an output portion for transmitting forward and reverse geared drive between a source of prime power and a reversible load-connected shaft, said differential transmission means incorporating dual gear sets and comprising a pair of sun gears, one connected to each of said input portions, a ring gear connected to said output portion, a thrust-reaction-absorbing carrier fixed in a disposition of generally adjacent relationship with respect to the load-connected shaft such that the respective adjacent end surfaces thereof define a predetermined space, and compound gear clusters rotatably carried by said carrier and establishing continuous geared drive between the ring gear and each of the sun gears; a pair of forward and reverse pressure-actuated units having pressure engaged clutches effective for frictionally coupling each of the transmission input portions to the source of prime power for synchronized rotation therewith, a pair of contra-rotating pump gears establishing cooperation to form a unidirectional pumping source of fluid under pressure, a power-source-connected first gear associated with one said pump gear and each having a one-way clutch portion connected thereto and engageable to establish a non-return drive from the former to the latter, a second pair of gears drivingly connected to the load connected shaft such that each gear is synchronized in rotation in a common direction with respect to the other and being associated with the pair of contra-rotating pump gears in a manner such that one gear of each pair has a one-way clutch portion connected thereto and engageable to establish a non-return drive to the just-named one of the contra-rotating pump gears, the other gear of each pair having a one-way clutch portion connected thereto and engageable to establish a non-return drive to the said other pump gear, whereby the unidirectional pumping source is effectively operated under all conditions of continuous operation of the source of prime power or the load-connected shaft and irrespective of the direction of rotation of the latter, means including a drive-selector control member forming separately controlled passages between the unidirectional pumping source and the respective pressure-actuated units for selectively communicating pressure fluid to either of the latter as desired to actuate the same, means intermediate the load-connected shaft and the carrier and sealingly closing the aforesaid space therebetween to define a closed slightly expansible container for a pressurizable body of fluid for transmitting reaction thrust from the former to the latter, and means of communication between one of the named passages and said fluid container for pressurizing said body of fluid in the latter at a pressure in proportion to the actuating pressure existing in the corresponding pressure-actuated unit.

11. A rotatable clutch housing structure having a forward portion containing a wear surface member, and arranged with actuable means for bodily shifting said member into a position of clamped drive-establishing engagement, said clutch housing structure having a similarly arranged portion to the rear of the forward portion and containing a similar wear surface member, the wear surface members being provided with supporting hub portions within the housing structure and cooperating to form a concentric hub assembly therewith and disposed with one hub portion extending into each said housing portion and affixed to and supporting the corresponding wear surface member, and anti-friction means included in said hub assembly and axially interlocking the wear-surface-supporting hub portions in a predetermined relationship to one another such that the bodily shift of either wear surface member into the above-described position of drive-establishing engagement under the actuation of one means, causes the other wear surface member to assume a predetermined non-contacting position.

12. A rotatable clutch housing structure having a forward portion containing a wear surface member, and arranged with actuable means incorporated therein including relatively movable friction faces for bodily shifting said member into a position of clamped drive establishing engagement therebetween, said clutch housing structure having a similarly arranged portion to the rear of the forward portion and containing a similar wear surface member, the wear surface members being provided with supporting hub portions within the housing structure and cooperating to form a hub assembly concentric therewith and disposed with one hub portion extending into each said housing portion and affixed to and supporting the corresponding wear surface member, and anti-friction means included in said hub assembly and axially interlocking the wear-surface-supporting hub portions in a predetermined relationship to one another such that the bodily shift of either wear surface member into the above-described position of drive-establishing engagement under the actuation of one means, causes the other wear surface member to shift into a non-contacting position substantially equidistant from the adjacent friction faces.

13. A rotatable clutch housing structure having a forward portion containing a wear surface member, and arranged with actuable means incorporated therein including relatively movable friction faces for bodily shifting said member from a first non-contacting position into a position of clamped drive-establishing engagement therebetween, said member when in said first non-contacting position being more closely spaced with respect to one friction face than to the other, said clutch housing structure having a similarly arranged portion to the rear of the forward portion and containing a similar wear surface member, the wear surface members being provided with supporting hub portions within the housing structure and cooperating to form a concentric hub assembly therewith and disposed with one hub portion extending into each said housing portion and affixed to and supporting the corresponding wear surface member, and anti-friction bearing means included in said hub assembly and axially interlocking the wear-surface-supporting hub portions in a predetermined relationship to one another such that the bodily shift of either wear surface member into the above-described position of drive-establishing engagement under the actuation of one means, causes the other wear surface member to shift from the first non-contacting position into a second non-contacting position substantially centered between the adjacent friction faces.

14. In combination, a rotatable clutch housing, a pair of disks therein, each disk of the pair having a wear surface at each side and being axially aligned with respect to the other disk, said clutch housing presenting a fixed friction face on one side of each disk and each being disposed in closely spaced adjacency to the wear surface at that side, and a pair of movable walls arranged one at each of the other sides of the disks in a manner such as to be actuable in axially opposite directions to establish contact respectively with the wear surface at that side, each disk of said pair being axially shiftable under such contact and having a supporting hub rigid therewith and coaxially disposed with respect to the supporting hub for the other disk, and means forming an axial connection between the hubs accommodating relative rotation and coordinating the axial motions of the disks supported thereby such that any axial movement of either disk due to the pressure of the above-described contact with a movable wall causes a like movement of separation of the other disk relative to its adjacent fixed friction face.

15. In combination, a rotatable clutch housing, a pair of clutches therein, each clutch of the pair having a wear surface at each side and being axially aligned with respect to the other clutch, said clutch housing presenting a fixed friction face on one side of each clutch and each being disposed in closely spaced adjacency to the wear surface at that side, and a pair of movable walls arranged one at each of the other sides of the clutches in a manner such as to be actuable in axially opposite directions to establish contact respectively with the wear surface at that side, each clutch of said pair being axially shiftable under such contact and having a supporting hub rigid therewith and coaxially disposed with respect to the supporting hub for the other clutch, and means forming an axial connection between the hubs accommodating relative rotation and coordinating the axial motions of the clutches supported thereby such that any axial movement of either clutch due to the pressure of the above-described contact with a movable wall causes a like movement of separation of the other clutch relative to its adjacent fixed friction face.

16. In combination, a rotatable clutch housing, a pair of disks therein, each disk of the pair having a wear surface at each side and being axially aligned with respect to the other disk, said clutch housing presenting a fixed friction face on the inner side of each disk and each being disposed in closely spaced adjacency to the wear surface at that side, and a pair of movable walls arranged one at each of the outer sides of the disks in a manner such as to be actuable inwardwise to establish contact respectively with the wear surface at that side, each disk of said pair being axially shiftable under such contact and having a supporting hub rigid therewith and coaxially disposed with respect to the supporting hub for the other disk, and means forming an axial connection between the hubs accommodating relative rotation and coordinating the axial motions of the respective hubs and the disks supported thereby such that any axial movement of either disk due to the pressure of the above-described contact with a movable wall causes a like movement of separation of the other disk relative to its adjacent fixed friction face.

17. Marine drive mechanism comprising first and second axially aligned shafts, said second shaft having means forming an axially extending recess at one end thereof, a thrust bearing receiving said second shaft adjacent said one end for taking the load of reaction thrust therein, transmission means for providing at least two power trains of the same speed ratio but of opposite directions of geared drive between said shafts and including a pair of pressure actuated units each effective to establish a different power train from the other, said transmission means incorporating compound gear clusters and having two input portions, a friction element carried by each said input portion and engageable under the influence of an appropriate pressure actuated unit, and a pinion carrier for the gear clusters disposed adjacent the said one end of the second shaft and supporting a companion member to the recess means cooperating with the latter to define a fluid container, means including operator-operated drive selector means forming separately controlled passages for communicating fluid pressure to either of said pressure actuated units as desired to actuate the same, means through which pressure fluid is introduced into said fluid container for limitedly expanding the same in an axial direction due to internal fluid thrust, and means of communication between said last named means and one of the named passages including a restriction for restrictively applying pressure in proportion to the actuating pressure existing in the corresponding unit, to the fluid container for proportionally unloading the thrust bearing by reason of the fluid thrust against the said one recessed end of the second shaft.

18. Marine drive mechanism comprising first and second axially aligned shafts, said second shaft having means forming an axially extending recess at one end thereof, a thrust bearing receiving said second shaft adjacent said one end for taking the load of reaction thrust therein, transmission means for providing power trains of opposite directions of geared drive between said shafts and including a pair of pressure actuated units each effective to establish a different power train from the other, said transmission means incorporating compound gear clusters and having two input portions, a friction element carried by each said input portion and engageable under the influence of an appropriate pressure actuated unit, and a pinion carrier for the gear clusters disposed adjacent the said one end of the second shaft and supporting a companion member to the recess means cooperating with the latter to define a fluid container, means including separately operated drive selector means forming separately controlled passages for communicating fluid pressure to either of said pressure actuated units as desired to actuate the same, means through which pressure fluid is introduced into said fluid container for limitedly expanding the same in an axial direction due to internal fluid thrust, and means forming separate communication paths between said last named means and each of the named passages including a common valve and a restriction in each path for restrictively applying pressure in proportion to the actuating pressure existing in the corresponding unit, to the fluid container for proportionally unloading the thrust bearing by reason of the fluid thrust against the said one recessed end of the second shaft, said valve being shiftable to close either communication path and open the other.

19. A marine drive mechanism comprising in combination a drive shaft, a reversible propeller connected shaft co-axial therewith, and having means forming a recess at the relatively inner end of the propeller connected shaft, transmission means for providing at least two power trains of the same speed-decreasing ratio but of opposite directions of geared reduction drive between said shafts, and including a pair of pressure actuated units each effective to establish a different power train from the other, said transmission means incorporating compound gear clusters and having two input portions, a friction element carried by each said input portion and engageable under the influence of an appropriate power-train-establishing pressure actuated unit, and a pinion carrier for the gear clusters disposed adjacent the recessed end of the propeller connected shaft and supporting a companion member to the recess means and cooperating with the latter to define a fluid container subject to minor volume changes so as to be slightly expansible and collapsible, a unidirectional pump source for fluid under pressure having a pair of contra-rotating shafts, a series-connected drive train comprising one of the speed decreasing power trains and a speed increasing gear train having a first one-way clutch portion driven at a predetermined speed smaller than the speed of said drive shaft at all times of effective operation of said speed decreasing power train, a second one-way clutch portion connected to one of said pump shafts and cooperating with the first one-way clutch portion to form an overrunning clutch operable to transmit drive from the speed increasing gear train to the said one pump shaft, a drive train including an overrunning clutch engageable to establish a non-return drive from the drive shaft to one of the pump shafts at a speed greater than said predetermined speed such that said first one-way clutch portion is caused to overrun said second portion and said pump shaft during effective operation of said speed decreasing power train, means including a drive selector control member forming separately controlled passages between the pressure fluid pump source and the respective pressure actuated units for selectively communicating pressure fluid to either of the latter as desired to actuate the same, and means of communication between said fluid container and one of the named passages for applying pressure in proportion to the actuating pressure existing in the corresponding unit, to the fluid container to expand the same in a direction to oppose reaction thrust in the propeller connected shaft.

20. A marine drive mechanism comprising in combination a drive shaft, a reversible propeller connected shaft co-axial therewith, and having means forming a recess at the relatively inner end of the propeller connected shaft, transmission means for providing at least two power trains of the same speed-decreasing ratio but of opposite directions of geared reduction drive between said shafts, and including a pair of pressure actuated units each effective to establish a different power train from the other, said transmission means incorporating compound gear clusters and having two input portions, a friction element carried by each said input portion and engageable under the influence of an appropriate power-train-establishing pressure actuated unit, and a pinion carrier for the gear clusters disposed adjacent the recessed end of the propeller connected shaft and supporting a companion member to the recess means and cooperating with the latter to define a fluid container subject to minor volume changes so as to be slightly expansible and collapsible, a unidirectional pump source for fluid under pressure and having a pair of contra-rotating shafts, a series connected drive train comprising one of the speed decreasing power trains and a speed increasing gear train having a pair of one-way clutch portions of opposite directions of rotation and driven at predetermined positive and negative speeds smaller than the speed of said drive shaft at all times of effective operation of said speed decreasing power train, another one-way clutch portion connected to each of said pump shafts and each cooperating with a respective one of the pair of said one-way clutch portions to form a corresponding pair of overrunning clutches operable to cause drive to be transmitted from said speed increasing gear train to the pump shafts, a drive train including an overrunning clutch engageable to establish a non-return drive from the drive shaft to the pump shafts at a speed greater than either of said predetermined speeds such that the pair of one-way clutch portions overruns said other portions and said pump shafts during effective operation of said speed decreasing power train, means including a drive selector control member forming separately controlled passages between the pressure fluid pump source and the respective pressure actuated units for selectively communicating pressure fluid to either of the latter as desired to actuate the same, and means of communication between said fluid container and one of the named passages for applying pressure in proportion to the actuating pressure existing in the corresponding unit to the fluid container to expand the same in a direction to oppose reaction thrust in the propeller connected shaft.

21. A marine drive mechanism comprising in combination a drive shaft, a reversible propeller connected shaft co-axial therewith, and having means forming a recess at the relatively inner end of the propeller connected shaft, transmission means for providing at least two power trains of the same speed-decreasing ratio but of opposite directions of geared reduction drive between said shafts, and including a pair of pressure actuated units each effective to establish a different power train from the other, said transmission means incorporating compound gear clusters and having two input portions, a friction element carried by each said input portion and engageable under the influence of an appropriate power-train-establishing pressure actuated unit, and a pinion carrier for the gear clusters disposed adjacent the recessed end of the propeller connected shaft and supporting a companion member to the recess means and cooperating with the latter to define a fluid container subject to minor volume changes so as to be slightly expansible and collapsible, a unidirectional pump source for fluid under pressure having a pair of contra-rotating shafts, a series connected drive train comprising one of the speed decreasing power trains and a speed increasing gear train having a first one-way clutch portion driven at a predetermined speed smaller than the speed of said drive shaft at all times of effective operation of said speed decreasing power train, a second one-way clutch portion connected to one of said pump shafts and cooperating with the first one-way clutch portion to form an overrunning clutch operable to transmit drive from the speed increasing gear train to the said one pump shaft, a drive train including an overrunning clutch engageable to establish a non-return drive from the drive shaft to said one pump shaft at a speed greater than said predetermined speed such that said first one-way clutch portion is caused to overrun said second portion and said pump shaft during effective operation of said speed decreasing power train, means including a drive selector control member forming separately controlled passages between the pressure fluid pump source and the respective pressure actuated units for selectively communicating pressure fluid to either of the latter as desired to actuate the same, and means of communication between said fluid container and one of the named passages for applying pressure in proportion to the actuating pressure existing in the corresponding unit, to the fluid container to expand the same in a direction to oppose reaction thrust in the propeller connected shaft.

22. A marine drive mechanism comprising in combination a drive shaft, a reversible propeller connected shaft co-axial therewith, and having means forming a recess at the relatively inner end of the propeller connected shaft, transmission means for providing at least two power trains of the same speed-decreasing ratio but of opposite direction of geared reduction drive between said shafts, and including a pair of pressure actuated units each effective to establish a different power train from the other, said transmission means incorporating compound gear clusters and having two input portions, a friction element carried by each said input portion and engageable under the influence of an appropriate power-train-establishing pressure actuated unit, and a pinion carrier for the gear clusters disposed adjacent the recessed end of the propeller connected shaft and supporting a companion member to the recess means and cooperating with the latter to define a fluid container subject to minor volume changes so as to be slightly expansible and collapsible, a unidirectional pump source for fluid under pressure having a pair of contra-rotating shafts, a series connected drive train comprising one of the speed decreasing power trains and a speed increasing gear train having a pair of one-way clutch portions of opposite directions of rotation and driven at predetermined positive and negative speeds smaller than the speed of said drive shaft at all times of effective operation of said speed decreasing power train, another one-way clutch portion connected to each of said pump shafts and each cooperating with a respective one of the pair of said one-way clutch portions to form a corresponding pair of overrunning clutches operable to cause drive to be transmitted from said speed increasing gear train to the pump shafts, a drive train including an overrunning clutch engageable to establish a non-return drive from the drive shaft to one of the pump shafts at a speed greater than either of said predetermined speeds such that the pair of one-way clutch portions overrun said other portions and said pump shafts during effective operation of said speed decreasing power train, means including a drive selector control member forming separately controlled passages between the pressure fluid pump source and the respective pressure actuated units for selectively communicating pressure fluid to either of the latter as desired to actuate the same, and means of communication between said fluid container and one of the named passages for applying pressure in proportion to the actuating pressure existing in the corresponding unit to the fluid container to expand the same in a direction to oppose reaction thrust in the propeller connected shaft.

23. In combination, a pair of oppositely rotating shafts one within the other with the inner shaft having an end extending beyond the corresponding end of the outer shaft, a clutch hub splined to each of the named ends of the oppositely rotating shafts for limited axial travel therealong, a clutch element fixed to each hub with one of the elements forming one of a first pair of companion friction engaging surfaces which when engaged cause one shaft to be drive connected for rotation in one sense, and the other of the elements forming one of a second pair of companion friction engaging faces which when engaged cause the other shaft to be drive connected for rotation in the same sense, clutch housing means about the shafts mounted for independent relative rotation and having means presenting the other friction engaging surfaces of the first and second pairs of companion friction engaging surfaces aforesaid, bearing means between the clutch hubs and axially interconnecting the same for coordinated movement such as to maintain a constant spaced apart relationship between clutch elements in all positions of travel of the hubs, said clutch housing means having means slidably related thereto for contacting said clutch elements and mutually exclusively causing either one of the same to be clamped into drive establishing engagement with its companion friction engaging face and at the same time causing the constantly spaced apart other clutch element to be drawn in a direction away from its companion friction engaging face, and interposed means continually biasing the slidably related means in a direction away from said other friction engaging surfaces of the first and second pairs aforesaid.

24. In combination, a pair of oppositely rotating shafts one within the other with the inner shaft having an end extending beyond the corresponding end of the outer shaft, a clutch hub splined to each of the named ends of the shafts for limited axial travel therealong, a clutch part fixed to each hub with one clutch part forming one of a first pair of friciton engaging surfaces which when engaged cause one shaft to be drive connected for rotation in one sense and the other of the clutch parts forming one of a second pair of friction engaging faces which when engaged cause the other shaft to be drive connected for rotation in the same sense, bearing means between the hubs and axially interconnecting the same for coordinated movement such as to maintain a constant spaced apart relationship between the clutch parts in all positions of travel of the hubs, housing means coaxially surrounding the named ends of the shafts and being independently rotatable with respect thereto, said housing means having internal faces adjacent different ones of the clutch parts presenting the other friction engaging surfaces of the first and second pairs aforesaid, means movable to contact said clutch parts and mutually exclusively causing either one of the same to be moved into a drive establishing resulting clutch engagement with the adjacent internal face in the housing means and at the same time causing the constantly spaced apart other clutch part to be moved in a direction away from the adjacent internal face in the housing means, and means continuously biasing the movable means away from the internal faces aforesaid.

25. In combination, a pair of oppositely rotating shafts one within the other with the inner shaft having an end extending beyond the corresponding end of the outer shaft, a clutch hub splined to each of the named ends of the oppositely rotating shafts for limited axial travel therealong, a clutch element fixed to each hub with one of the elements forming one of a first pair of friction engaging surfaces which when engaged cause one shaft to be drive connected for rotation in one sense, and the other of the elements forming one of a second pair of friction engaging faces which when engaged cause the other shaft to be drive connected for rotation in the same sense, clutch housing means about the shafts mounted for independent relative rotation and having means presenting the other friction engaging surfaces of the first and second pairs of aforesaid, bearing means between the clutch hubs and axially interconnecting the same for coordinated movement such as to maintain a constant spaced apart relationship between clutch elements in all positions of travel of the hubs, said clutch housing means incorporating separate pressure movable members slidably related thereto for contacting said clutch elements and mutually exclusively causing either one of the same to be moved into drive establishing engagement with its companion friction engaging face and at the same time causing the constantly spaced apart other clutch element to be moved in a direction away from its companion friction engaging face, and interposed means continually biasing the respective pressure movable members away from said other friction engaging surfaces of the first and second pairs aforesaid.

26. In combination, a pair of oppositely rotating shafts one within the other with the inner shaft having an end extending beyond the corresponding end of the outer shaft, a clutch hub splined to each of the named ends of the shafts for limited axial travel therealong, a clutch part fixed to each hub with one clutch part forming one of a first pair of friction engaging surfaces which when engaged cause one shaft to be drive connected for rotation and the other of the clutch parts forming one of a second pair of friction engaging surfaces which when engaged cause the other shaft to be drive connected for rotation, bearing means between the hubs and axially interconnecting the same for coordinated movement such as to maintain a constant spaced apart relationship between the clutch parts in all positions of travel of the hubs, housing means coaxially surrounding the named ends of the shafts and being independently rotatable with respect thereto, said housing means having internal faces adjacent different ones of the clutch parts forming the other friction engaging surfaces of the first and second pairs aforesaid, hydraulic clutch pistons movable to contact said clutch parts and mutually exclusively causing either one of the same to be moved into a drive establishing resulting clutch engagement with the adjacent internal face in the housing means and at the same time causing the constantly spaced apart other clutch part to be moved in a direction away from the adjacent internal face in the housing means, and means continuously biasing the clutch pistons away from the internal faces aforesaid.

References Cited in the file of this patent

UNITED STATES PATENTS

| | | |
|---|---|---|
| 850,247 | Petri | Apr. 16, 1907 |
| 857,393 | Hagman | June 18, 1907 |
| 1,845,332 | Reece et al. | Feb. 16, 1932 |
| 2,077,663 | Batten | Apr. 20, 1937 |
| 2,143,321 | Kegresse | Jan. 10, 1939 |
| 2,202,378 | Hertrich | May 28, 1940 |
| 2,291,241 | Lawrence | July 28, 1942 |
| 2,341,747 | Vincent | Feb. 15, 1944 |
| 2,399,853 | Chilton | May 7, 1946 |
| 2,416,154 | Chilton | Feb. 18, 1947 |
| 2,521,239 | McDowell et al. | Sept. 5, 1950 |
| 2,567,703 | Grandgirard | Sept. 11, 1951 |
| 2,600,043 | Armitage et al. | June 10, 1952 |
| 2,620,685 | Smirl | Dec. 9, 1952 |
| 2,633,760 | Kelley | Apr. 7, 1953 |
| 2,658,405 | Dodge | Nov. 10, 1953 |

FOREIGN PATENTS

| | | |
|---|---|---|
| 929,571 | France | July 15, 1947 |